3,278,168
COMBINED MILL, MIXER AND SPREADER
George C. Wood, Edenton, N.C.
Filed May 22, 1964, Ser. No. 369,470
11 Claims. (Cl. 259—114)

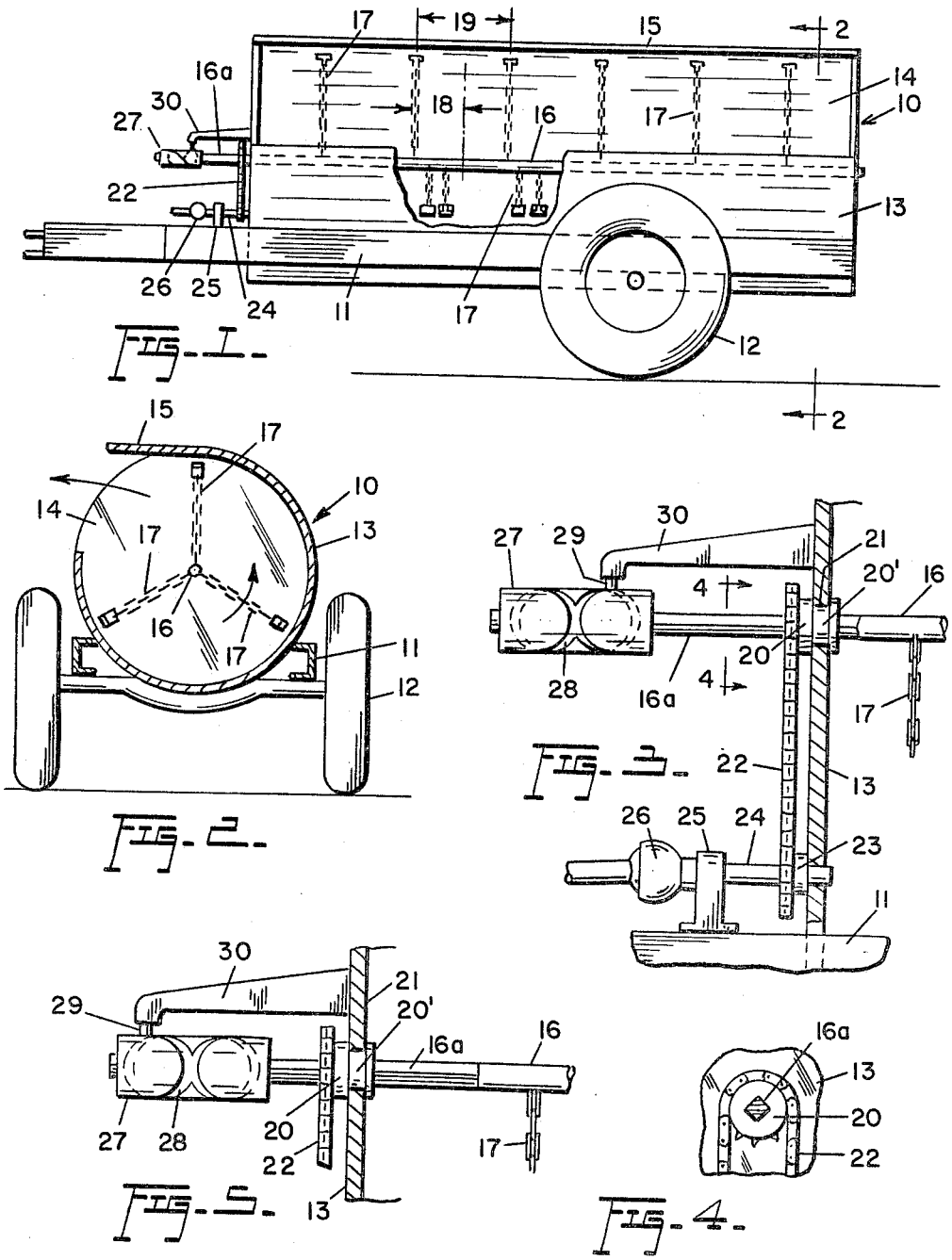
Oct. 11, 1966 — G. C. WOOD — 3,278,168
COMBINED MILL, MIXER AND SPREADER
Filed May 22, 1964 — 2 Sheets-Sheet 1
INVENTOR
GEORGE C. WOOD
BY Munson H. Lane
ATTORNEY Oct. 11, 1966 G. C. WOOD 3,278,168
COMBINED MILL, MIXER AND SPREADER
Filed May 22, 1964 2 Sheets-Sheet 2
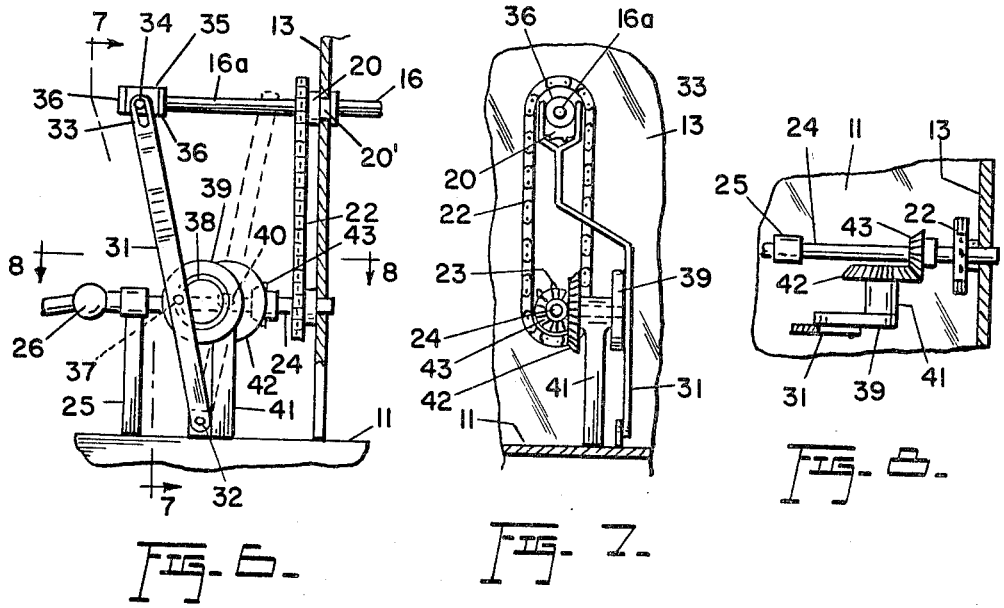
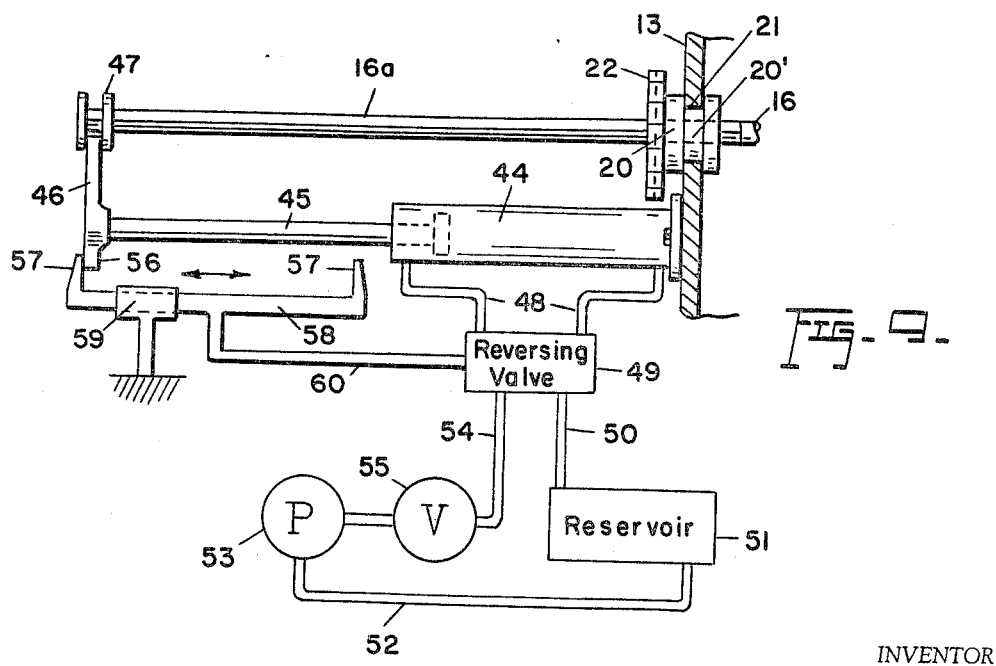
INVENTOR
GEORGE C. WOOD
BY Murrison H. Lane
ATTORNEY

United States Patent Office 3,278,168
Patented Oct. 11, 1966

This invention relates to new and useful improvements in combined mills, mixers and spreaders for material such as silage, manure, or the like, and in particular the invention concerns itself with milling, mixing and spreading apparatus of the general type wherein the material to be worked upon is placed in a substantially cylindrical housing containing a beater unit which rotates about the axis of the housing for milling, beating, breaking up and mixing the material and ultimately discharging the same through a lateral opening in the housing onto the ground, into a trough, or the like.

Apparatus of this general type is usually mounted on a wagon drawn by a tractor, with the rotary beater unit being driven from the tractor power take-off. The beater unit assumes the form of a group or groups of beater members connected to a shaft which is rotatable and axially disposed in the housing. A substantial amount of power is required to rotate the shaft so that the beater members may properly perform their intended function, and inasmuch as the amount of power which is available at the power take-off is limited, as a practical matter a corresponding limitation is placed on the size of the beater unit, the size of the housing and, therefore, on the capacity of the apparatus in terms of the amount of material which it can effectively handle in a single load.

The principal object of this invention is to materially overcome the limitations above outlined by the provision of an improved apparatus which is capable of handling in a single load twice the amount of material as heretofore with a given amount of power, or conversely, handling the same amount of material with only half the amount of power which was heretofore required.

This object is attained by reducing the number of beater members in a housing of a given size to one half of the number which would conventionally be provided, spacing such beater members longitudinally on the shaft, and providing means for reciprocating the shaft during its rotation so that the spaced beater members rotate in planes which shift longitudinally in the housing and work on material in the entire housing, but by virtue of their reduced number, require only one half the power which would be needed if the full number of beater members were provided. Consequently, it is possible to double the size and capacity of the housing without requiring more than a given amount of power. It may be noted at this point that references herein to "twice" or "double" and to "half" are for illustrative purposes only to show a relation between capacity on one hand and power on the other, which relation is exemplified in the proportion of 2 to 1. However, depending upon the actual size of the machine and the consistency of the material being handled, the proportion of capacity and power may be 3 to 2, or 3 to 1, or 5 to 2, et cetera, as practical conditions may dictate. In other words, the number of beater members may be reduced to one-third, for example, thus requiring only one-third the power and, with the same power available, increasing the capacity three-fold, as will be readily appreciated.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of the apparatus of the invention, partially broken away to reveal its construction;

FIGURE 2 is a vertical sectional view, taken substantially in the plane of the line 2—2 in FIGURE 1;

FIGURE 3 is an enlarged view, partly in section and partly in elevation, showing the shaft driving and reciprocating means;

FIGURE 4 is a fragmentary sectional detail, taken substantially in the plane of the line 4—4 in FIGURE 3;

FIGURE 5 is a fragmentary view, similar to that shown in FIGURE 3 but illustrating the shaft in a different position;

FIGURE 6 is a fragmentary side elevational view showing a modified embodiment of the shaft reciprocating means;

FIGURE 7 is a fragmentary sectional view, taken substantially in the plane of the line 7—7 in FIGURE 6;

FIGURE 8 is a fragmentary sectional view, taken substantially in the plane of the line 8—8 in FIGURE 6; and FIGURE 9 is a largely diagrammatic view showing another modified embodiment of the shaft reciprocating means.

Referring now to the accompanying drawings in detail, more particularly to FIGURES 1–5 inclusive, the general reference numeral 10 designates an apparatus for milling, mixing and spreading material such as silage, manure, or the like. The apparatus is preferably mounted upon a wagon or chassis 11 equipped with travelling wheels 12, the chassis being adapted to be drawn by a tractor (not shown) in the usual manner.

The apparatus 10 comprises a substantially cylindrical housing 13 which is mounted horizontally on the chassis 11, one side of the upper portion of the housing being provided with a lateral opening 14 through which material placed in the housing and worked upon by the beater unit in the housing may be discharged onto the ground or into a trough, or the like. A suitable deflector 15 may be provided on the housing above the discharge opening 14.

The beater unit in the housing comprises a rotatable shaft 16 which extends axially in the housing and has connected thereto a plurality of beater members 17. As shown, these members are in the conventional form of flails, although beater members of a rigid construction may also be employed. In any event, in accordance with conventional practice it is customary to space the beater members longitudinally of the shaft as well as to circumferentially offset each member from the next as illustrated in FIGURE 2. Thus, as the shaft rotates, the several beater members rotate in closely spaced, parallel planes transverse of the housing, the spacing of these planes of rotation being close enough for the beater members to work upon material throughout the length of the housing. This, of course, requires a relatively large number of beater members to be provided, and since only a given number of beater members can be efficiently operated by a power source of a given horsepower, the number of beater members used, the size of the housing and, consequently, the single load capacity of the machine are necessarily restricted by the power limitation.

The invention materially improves this condition by reducing the power requirement so that a proportionately larger capacity can be handled with a given amount of power, the power requirement being reduced by simply reducing the number of beater members used in a housing of a given size. Thus, for example, in a conventional arrangement the beater members in a common radial plane may be spaced apart longitudinally by a distance indicated at 18 in FIGURE 1, but in the improved arrangement they may be spaced apart by twice that distance as indicated at 19, whereby the number of beater members in the machine is reduced to one-half. Under such conditions the machine may be constructed twice the size and capacity, that is, with a housing twice as long, and the beater members operated with the same given amount of power. Of course, by spacing the beater member further apart than is conventional, regions of material in the housing disposed between the planes of rotation of the beater members would not be worked upon and consequently, the invention provides means for reciprocating the shaft 16, whereby the planes of rotation of the beater members are shifted longitudinally in the housing and material throughout the length of the housing is worked upon by the beater members.

To facilitate reciprocation of the shaft 16, it is slidably mounted in the ends of the housing and projects at one end therefrom, as indicated at 16a. Of course, rotation has to be imparted to the shaft in order to operate the beater members 17, and for this purpose the projecting shaft portion 16a is preferably made of a polygonal cross-section and passes slidably through a polygonal bore in a drive sprocket 20 (see FIG. 4) which is disposed at the adjacent end wall of the housing 13. The sprocket 20 is provided with an annularly grooved boss 20' which is rorotatably seated in an aperture 21 formed in the housing end wall, whereby the sprocket is free to rotate but axial movement thereof is prevented. Also, while the shaft portion 16a is slidable in the sprocket, the shaft is rotatable with the sprocket, as will be clearly apparent. The sprocket 20 is connected by a chain drive 22 to a similar sprocket 23 on a countershaft 24 which is journalled by suitable bearing means 25 on the chassis 11, the countershaft 24 being equipped with a suitable universal joint 26 and adapted for connection to the power take-off of the associated tractor.

A cylindrical cam 27 is secured to the projecting shaft portion 16a and is formed with a continuous cam track 28 which is engaged by a pin 29. The latter is supported in a fixed position by an arm 30 which is secured to the housing 13. The cam track 28 is so arranged that when the shaft 16 together with the cam 27 are rotated by the chain drive 22, engagement of the pin 29 with the cam track will cause the cam and the shaft 16 to be axially slid or shifted, first in one direction and then in the other, thus imparting a reciprocating movement to the shaft concurrently with its rotation. The stroke of this reciprocating movement is substantially equal to or slightly greater than the spacing 19 of the beater members 17 on the shaft 16, whereby the planes of rotation of the beater members are shifted in the housing to enable the beater members to work upon material throughout the length of the housing, as will be readily understood.

The cam arrangement of FIGURES 1–5 is such that the shaft 16 is reciprocated to and fro once during each revolution thereof, which may be satisfactory in many instances. However, if the material worked upon is of a relatively hard consistency, it may be more desirable to reciprocate the shaft at a slower rate with respect to its speed of rotation. In such event, a modified arrangement exemplified in FIGURES 6–8 may be utilized, wherein a lever 31 is pivoted to the chassis 11 as at 32 and has a forked extremity or yoke 33 connected by pins 34 to a collar 35 which is rotatably but non-slidably mounted on the shaft portion 16a, as for example, by being disposed between a pair of shoulders 36 on the shaft portion. While the shaft portion 16a is polygonal for slidable driving engagement with the sprocket 20, the region thereof carrying the collar 35 may be cylindrical so as to permit the shaft to turn freely within the relatively stationary collar.

The intermediate portion of the lever 31 carries a cam follower in the form of a pin 37 which engages the cam track 38 of a cam 39. The latter is secured to a shaft 40 which is journalled in a suitable bearing bracket 41 and also carries a relatively large bevel gear 42 which meshes with a relatively small bevel gear 43 affixed to the countershaft 24. The reduction gearing 42, 43 thus rotates the cam 39 at a slower speed than the shafts 24, 16, so that the rate of rotation of the beater shaft is faster than its rate of reciprocation.

FIGURE 9 illustrates another modified arrangement of the shaft reciprocating means which, in this instance, utilizes a fluid operator in the form of a hydraulic cylinder 44 with a reciprocable piston rod 45. The cylinder 44 is secured to the housing 13 in parallel with the shaft portion 16a and the outer end of the piston rod 45 is provided with a rigid yoke 46 which engages an annularly grooved collar 47 secured to the shaft portion 16a so that reciprocating movement of the piston rod is imparted to the shaft 16 while the shaft is rotated by the chain drive 22. The cylinder 44 is of the double-acting type and fluid delivery and return conduits 48 extend from the ends of the cylinder to a suitable reversing valve 49 of a conventional type. A fluid return conduit 50 extends from the valve 49 to a fluid reservoir 51, from which fluid passes through a conduit 52 to a pump 53 and then through a conduit 54 to the valve 49 to complete the fluid circuit. A flow control valve 55 is provided in the conduit 54, as shown.

The yoke 46 is formed with a projection 56 which is engageable with abutments 57 at the ends of a bar 58 which is reciprocable in a suitable bearing 59, the bar 58 being connected by a control rod 60 to the reversing valve 49. The arrangement is such that when the piston rod 45 reaches one end of its travel and the projection 56 engages one of the abutments 57, the bar 58 and rod 60 are slid in one direction to actuate the reversing valve 49 so as to cause the piston rod 45 to travel in the opposite direction, whereupon the same action takes place at the other abutment 57 and automatic reciprocation of the piston rod 45 and of the shaft 16 is effected. The control valve 55 may be adjusted to vary the rate of flow of fluid through the hydraulic system and thereby vary the speed of reciprocation of the shaft 16 relative to its speed of rotation.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, falling within the spirt and scope of the invention as claimed.

What is claimed as new is:

1. In a material milling, mixing and discharging apparatus, the combination of a material housing, a rotatable and slidable shaft disposed axially in said housing, said housing having a discharge opening extending along one side thereof parallel to said shaft, beater and material discharge members connected at longitudinally spaced points to said shaft, means for rotating said shaft, and means for reciprocatingly sliding said shaft to and fro whereby planes of rotation of said beater members may be shifted longitudinally in said housing during the beating and material discharging operation.

2. In a material milling, mixing and discharging apparatus, the combination of a material housing, said housing having a discharge opening extending along one side thereof and parallel to said shaft, a rotatable and slidable shaft disposed axially in said housing, longitudinally spaced groups of beater and material discharge members connected to said shaft, means for rotating said shaft, and means for reciprocatingly sliding said shaft whereby planes of rotation of said beater members may be shifted longitudinally in said housing, the reciprocating stroke of the shaft corresponding substantially to the longitudinal spacing of said groups of beater members during the beating and material discharging operation.

3. The apparatus as defined in claim 2 wherein the beater members in each group are spaced circumferentially and longitudinally of said shaft.

4. In a material milling, mixing and spreading apparatus, the combination of a substantially cylindrical housing, a rotatable and slidable shaft disposed axially in said housing, beater members connected at longitudinally spaced points to said shaft, means for rotating said shaft, and means for reciprocatingly sliding said shaft whereby planes of rotation of said beater members may be shifted longitudinally in said housing, said means for rotating said shaft including a rotatable drive member disposed in a fixed position relative to said housing, said shaft extending slidably through but being rotatable with said drive member.

5. In a material milling, mixing and spreading apparatus, the combination of a substantially cylindrical housing, a rotatable and slidable shaft disposed axially in said housing, beater members connected at longitudinally spaced points to said shaft, means for rotating said shaft, and means for reciprocatingly sliding said shaft whereby planes of rotation of said beater members may be shifted longitudinally in said housing, said means for reciprocatingly sliding said shaft including a cam secured to and rotatable with said shaft, said cam having a cam track, and a fixedly mounted member engaging said cam track whereby to reciprocate the cam and the shaft when the shaft is rotated.

6. In a material milling, mixing and spreading apparatus, the combination of a substantially cylindrical housing, a rotatable and slidable shaft disposed axially in said housing, beater members connected at longitudinally spaced points to said shaft, means for rotating said shaft, and means for reciprocatingly sliding said shaft whereby planes of rotation of said beater members may be shifted longitudinally in said housing, said means for reciprocatingly sliding said shaft including a rotatably mounted cam having a cam track, lever means, a cam follower provided on said lever means and engaging said cam track, and means operatively connecting the lever means to said shaft.

7. In a material milling, mixing and spreading apparatus, the combination of a substantially cylindrical housing, a rotatable and slidable shaft disposed axially in said housing, beater members connected at longitudinally spaced points to said shaft, means for rotating said shaft, and means for reciprocatingly sliding said shaft whereby planes of rotation of said beater members may be shifted longitudinally in said housing, said means for reciprocatingly sliding said shaft including a double-acting fluid operator having a reciprocable piston rod, and means operatively connecting said piston rod to said shaft.

8. The apparatus as defined in claim 7 together with a reversing valve for said fluid operator, and means responsive to reciprocation of said piston rod for actuating said reversing valve.

9. In a material milling, mixing and spreading apparatus, the combination of a material receptacle, a rotatable shaft axially slidable relative to said receptacle, beater members connected at longitudinally spaced points to said shaft for working on material in the receptacle, means for rotating said shaft, and means for reciprocatingly sliding said shaft whereby planes of rotation of said beater members may be shifted relative to said receptacle, and said means for rotating said shaft including a rotatable drive member disposed in a fixed position relative to said housing, said shaft extending slidably through but being rotatable with said drive member.

10. In a material milling, mixing and spreading apparatus, the combination of a material receptacle, a rotable shaft axially slidable relative to said receptacle, longitudinally spaced groups of beater members connected to said shaft for working on material in the receptacle, means for rotating said shaft, and means for reciprocatingly sliding said shaft whereby planes of rotation of said beater members may be shifted relative to said receptacle, the reciprocating stroke of the shaft corresponding substantially to the longitudinal space of said groups of beater members, and said means for rotaing said shaft including a rotatable drive member disposed in a fixed position relative to said housing, said shaft extending slidably through but being rotatable with said drive member.

11. An apparatus as defined in claim 1 wherein the material receptacle is carried by a vehicle having a power source and said shaft rotating means is actuated from said power source.

References Cited by the Examiner
UNITED STATES PATENTS

Re. 12,511  7/1906  Thill _____ 259—114
   71,723  12/1867  Emmore _____ 259—114

WALTER A. SCHEEL, *Primary Examiner.*

WILLIAM I. PRICE, *Examiner.*

ROBERT W. JENKINS, *Assistant Examiner.*